United States Patent [19]

Zielsdorf

[11] 4,275,568
[45] Jun. 30, 1981

[54] REFRIGERATED DOUGH MIXER
[75] Inventor: Franklin J. Zielsdorf, Sidney, Ohio
[73] Assignee: Peerless Machinery Corporation, Shelby, Ohio
[21] Appl. No.: 70,754
[22] Filed: Aug. 30, 1979
[51] Int. Cl.³ .............................................. A23G 9/00
[52] U.S. Cl. .............................. 62/342; 165/109 R; 366/147; 366/149
[58] Field of Search ............. 62/342, 343; 165/109 R, 165/169; 366/145, 147, 149

[56] References Cited

U.S. PATENT DOCUMENTS

| | | |
|---|---|---|
| 1,213,879 | 1/1917 | Jensen . |
| 1,778,363 | 10/1930 | Kirchoff . |
| 2,265,552 | 12/1941 | Sticelber .................... 62/342 X |
| 2,274,220 | 2/1942 | Sticelber .................... 62/342 X |
| 2,415,711 | 2/1947 | Sticelber ........................ 62/1 |
| 2,593,705 | 4/1952 | Sticelber ........................ 62/1 |
| 2,931,320 | 4/1960 | Bandel . |
| 3,155,056 | 11/1964 | Smith et al. . |
| 3,503,344 | 3/1970 | Sternberg . |
| 4,095,742 | 6/1978 | Schumacher .................. 62/225 X |

FOREIGN PATENT DOCUMENTS

833392  7/1949  Fed. Rep. of Germany ........... 165/169

*Primary Examiner*—William E. Tapolcai, Jr.
*Attorney, Agent, or Firm*—Biebel, French & Nauman

[57] ABSTRACT

A temperature controlled dough mixer having a bowl which is provided with a cooled sheet panel, a pair of cooled end panels and a cooled breaker tube extending between the end panels. A cooled agitator may be rotatably mounted between the end panels of the bowl. Cooling of the sheet panel is effected by a series of internal, side-by-side flow channels which are interconnected at alternate ends to define a plurality of segregated serpentine flow paths for an appropriate cooling fluid. The mixer also includes temperature sensing means for sensing the temperature within the bowl and control means responsive to the temperature sensing means for controlling the flow of cooling fluid through the cooled portions of the mixer.

12 Claims, 14 Drawing Figures

REFRIGERATED DOUGH MIXER

BACKGROUND OF THE INVENTION

The present invention relates to mixers for mixing dough and other similar viscous materials which are subject to a temperature rise during the mixing process. Preferably bread doughs should be mixed at a temperature of about 78° F. to 80° F. The friction and viscous shear encountered during the mixing process causes a temperature rise, which becomes more severe as the mixing speed increases. Such a temperature rise can cause the dough to become sticky and difficult to process.

A common solution to the above temperature problem is the use of cooled or refrigerated mixing components. Thus, as taught in Kirchoff U.S. Pat. No. 1,778,363, there may be provided a mixing bowl having a chilled breaker tube extending from end-to-end. The dough is directed against the breaker tube by a rotating agitator arrangement and is cooled by water or other cooling fluid directed through the breaker tube. The breaker tube is disclosed as being rotatable, and rotary seal means are provided for circulating the cooling fluid through the breaker tube.

Other means for cooling a dough mixer are disclosed Sticelber U.S. Pat. Nos. 2,415,711 and 2,593,705. Both of these patents disclose a mixing bowl having a curved sheet panel, which is provided with a series of side-by-side channels extending lengthwise along the bowl. The ends of the channels are interconnected to provide a serpentine flow path for a refrigerating liquid pumped from an appropriate source. Sticelber '705 applies the cooling fluid in liquid form to an expansion valve, which is mounted on the mixing bowl.

Another refrigerated dough mixer is disclosed in Smith et al. U.S. Pat. No. 3,155,056 and comprises a pair of rotating paddles mounted within a closed vessel. Means are provided for pumping a cooling fluid through both of the paddles and also through a cooling jacket surrounding the mixing vessel.

Still another prior art dough mixer having temperature regulating means is disclosed in Bandel U.S. Pat. No. 2,931,320. Bandel provides a mixer having a closed vessel having two segregated semi-lunar cooling chambers extending lengthwise along the length of the mixer. Bandel also provides cooled end walls. Another prior art mixer having temperature controlled means is disclosed in Jensen U.S. Pat. No. 1,213,879. Jensen deals with treatment of liquid materials, which are quite different in nature from dough. The disclosed apparatus is said to be suitable for fermenting or ripening milk. The arrangement includes a rotating agitator comprising a pair of independent spiral ducts. Temperature control fluids are independently pumped through such ducts via rotary seals at the ends of the agitator.

SUMMARY OF THE INVENTION

This invention provides a dough mixer having an improved cooling arrangement. In one aspect the invention contemplates a refrigerated dough mixer comprising a tilting open top bowl including a curved sheet panel and a pair of parallel end panels disposed at opposite ends of the sheet panel and means within the sheet panel defining a plurality of segregated serpentine flow paths, each having inlet and outlet ports connected for separately circulating a supply of cooling fluid and cooperatively cooling substantially the entire interior of the sheet panel.

In another aspect this invention provides a refrigerated dough mixer comprising a tilting open top bowl including a curved sheet panel, a pair of parallel end panels disposed at opposite ends of the sheet panel, a hollow breaker tube extending between the end panels, means for providing a supply of cooling fluid to all of the sheet panel, end panels, and breaker tube, means for measuring the temperature within the bowl and control means responsive to the temperature sensing means for controlling the flow of cooling fluid.

In preferred embodiment there is also provided an agitator comprising a hollow tubular structure extending back and forth between the end panels, a pair of hollow support shafts for supporting the ends of the agitator, and a pair of rotary seals connecting a cooling fluid supply means with the support shafts and the interior of the agitator. In the preferred embodiment all surfaces in contact with the dough are chilled for avoidance of undesired temperature rise.

In an alternative embodiment there is provided a hollow refrigerated dough retarding tube which extends between the end panels of the bowl in parallel relationship with the hollow breaker tube. The dough retarding tube assists in the mixing process without producing any temperature increase within the dough.

DESCRIPTION OF THE PREFERRED EMBODIMENTS

Figure 1:
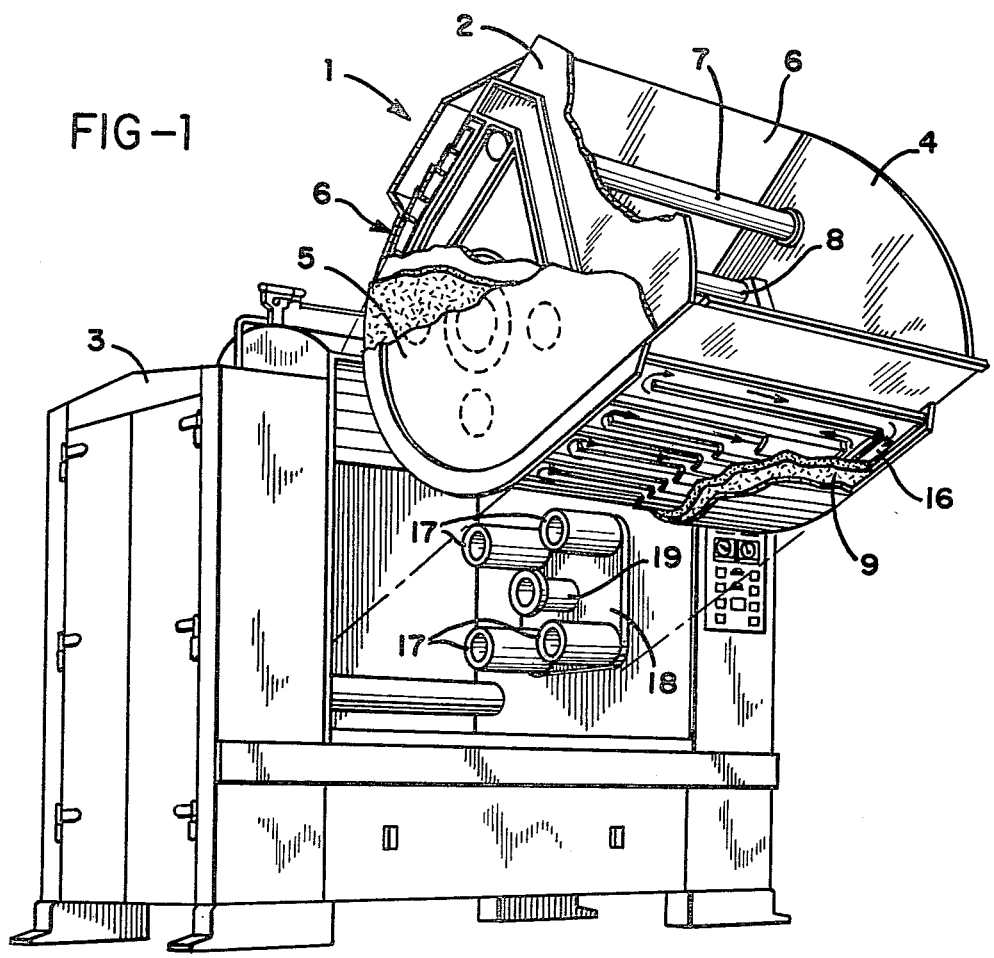
FIG. 1 is a partially exploded and partially cut away perspective view of a dough mixer.

A mixer in accordance with the present invention preferably is constructed as generally illustrated in FIG. 1. The mixer 1 comprises a mixing bowl 2 mounted within a cabinet 3. Mixing bowl 2 is supported at each end by a set of spacers 17 mounted on a bowl support plate 18. Mixing bowl 2 is an open top arrangement comprising a right end panel 4, a left end panel 5, and a generally U-shaped sheet panel 6. A hollow breaker tube 7 and an agitator 8 are mounted within mixing bowl 2. Agitator 8 is supported at each end by support shafts 19 and 20 (see FIG. 7). Agitator 8 may be a solid structure or may be hollow as hereinafter described. Insulation is provided as indicated generally at 9.

Figure 2:
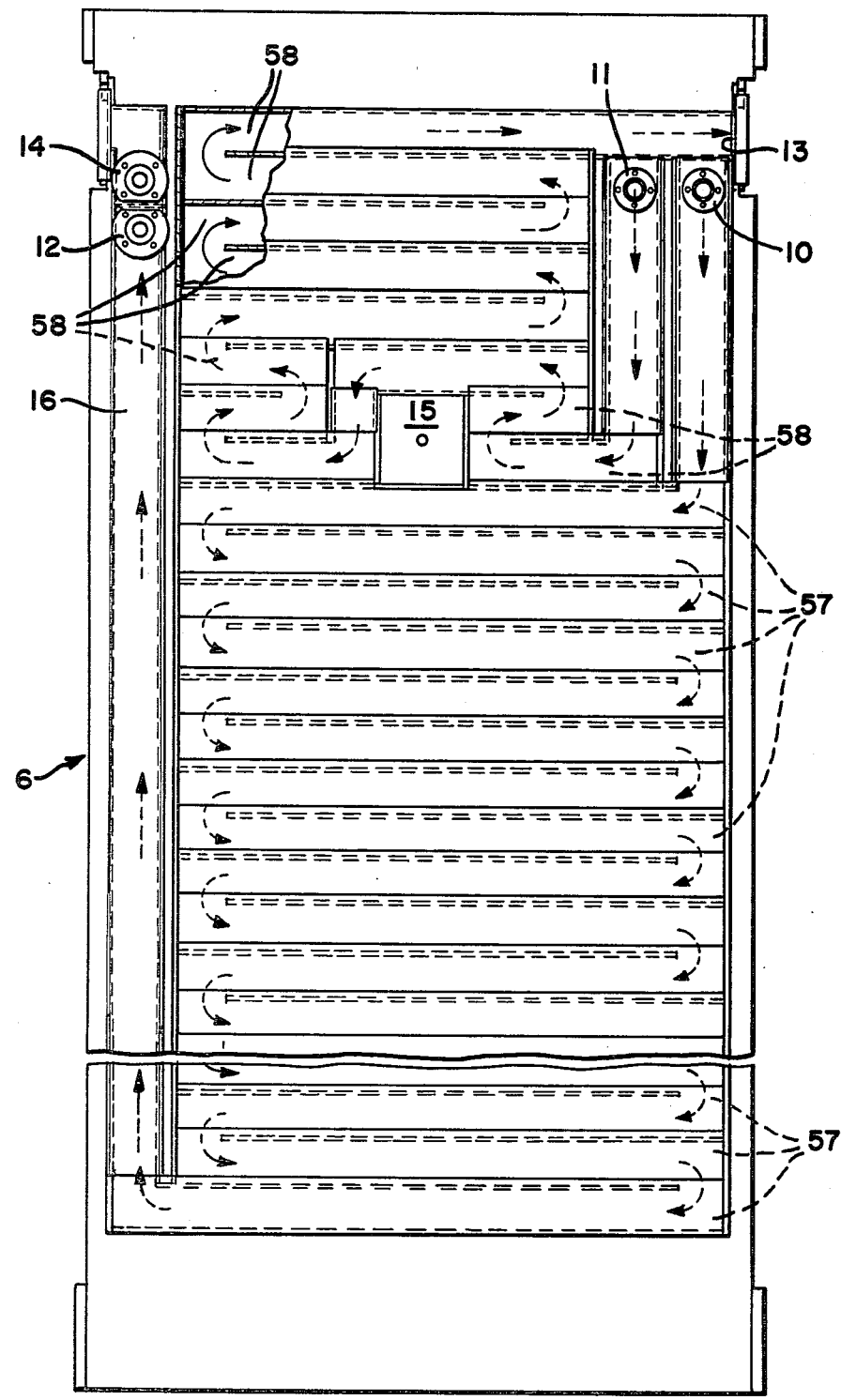
FIG. 2 is a developed view of a sheet panel taken along lines 2—2 of FIG. 3.

End panels 4 and 5 and sheet panel 6 are both provided with internal channel arrangements to accommodate the flow of a refrigerating fluid. Flow passages within sheet panel 6 are best illustrated in FIG. 2, which is a developed view taken along lines 2—2 of FIG. 3. FIG. 2 illustrates channel defining means which provide two segregated serpentine flow paths, each having its own inlet and outlet ports for circulating a flow of cooling fluid. Thus cooling fluid following a first flow path enters the sheet panel via inlet port 10 and follows a serpentine flow path along a series of channels 57, which are interconnected at alternate ends for cooling the lower and front portions of the sheet panel. After cooling the front portion of the sheet panel, this coolant enters exit channel 16 and leaves the sheet panel via exit port 12. Exit port 12 is connected to a compressor and heat exchanger as hereinafter described.

The second serpentine flow path begins at inlet port 11 and follows along a series of interconnected channels 58 to cool the rear portion of the sheet panel. Cooling fluid which enters through inlet port 11 follows this second path and leaves the sheet panel through an exit port as indicated generally at 13. After passing through exit port 13, this cooling fluid passes successively through left end panel 5, breaker tube 7, and right end panel 4. Thereafter the cooling fluid leaves mixing bowl 2 via exit port 14.

It is therefore seen that sheet panel 6 is cooperatively cooled by cooling fluid flowing through a plurality of segregated serpentine flow paths. The coolant flowing along each path leaves the sheet panel before it has warmed up excessively and while it still has substantial cooling capability. In fact, the coolant which flows along the second above described path, leaves the sheet panel with sufficient cooling capability for cooling the end panels and the breaker tube. The temperature of the sheet panel is sensed by a thermometer located within thermometer well 15. There is a display (not illustrated) for indicating this temperature to the operator.

Figure 3:
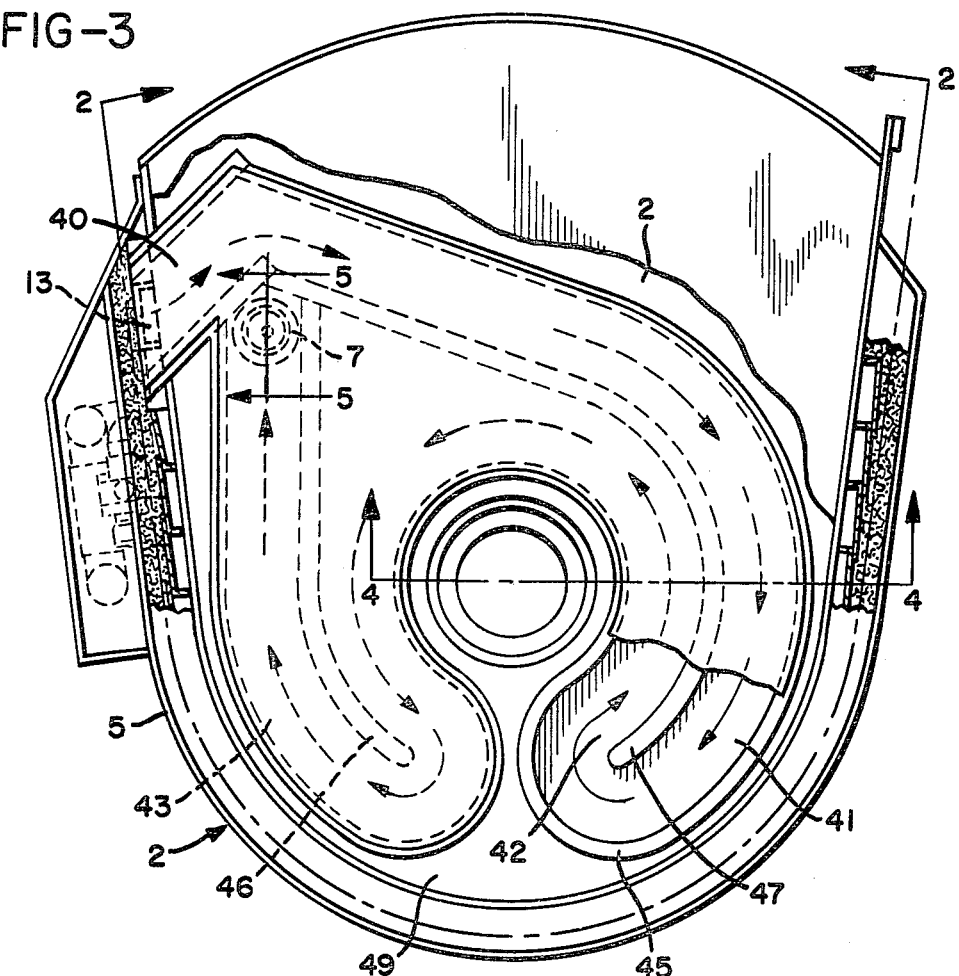
FIG. 3 is a partially cut away side elevation view of a mixing bowl.
Figure 4:
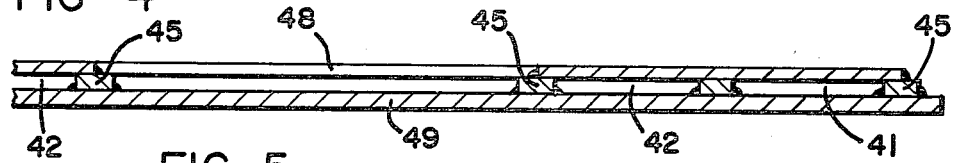
FIG. 4 is a view taken along lines 4—4 of FIG. 3.

After the cooling fluid within the second above mentioned path flows through exit port 13, it flows into a channel 40 within left end panel 5. See FIGS. 8, 10, 12, and 13. As shown in FIG. 3, the cooling fluid flows from channel 40 through channels 41, 42, and 43 successively. Channels 41, 42, and 43 are defined by a wall member 45, rib members 46 and 47, and cover plates 48 and 49. See FIG. 4.

Figure 5:
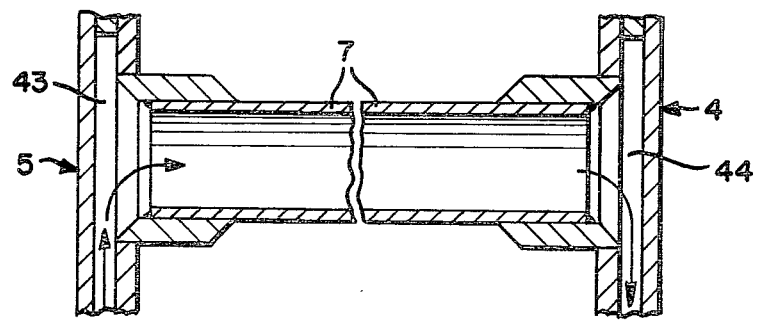
FIG. 5 is a cross sectional view of a breaker tube.
Figure 9:
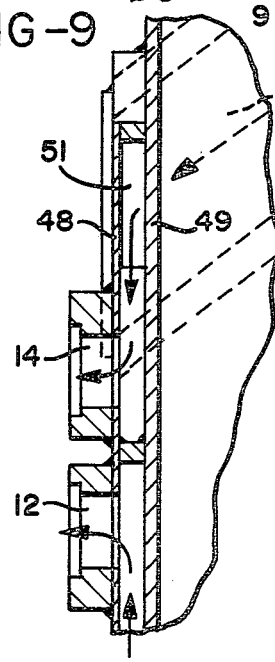
FIG. 9 is a view taken along lines 9—9 of FIG. 8.
Figure 10:
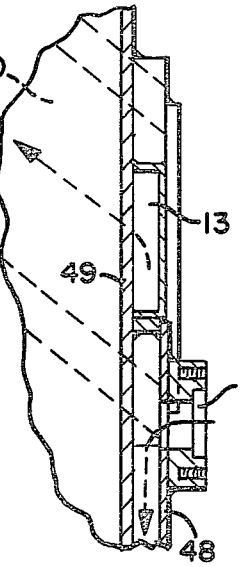
FIG. 10 is a view taken along lines 10—10 of FIG. 8.
Figure 11:
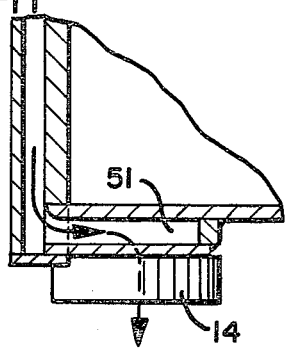
FIG. 11 is a view taken along lines 11—11 of FIG. 8.
Figure 12:
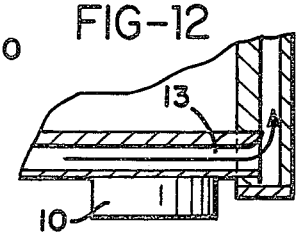
FIG. 12 is a view taken along lines 12—12 of FIG. 8.

The flow path from channel 43 continues through breaker tube 7, as illustrated in FIG. 5. Cooling fluid flowing through breaker tube 7 enters right end panel 4 via channel 44, as also illustrated in FIG. 5. Thereafter the cooling fluid cools right end panel 4 by following a path similar to the path described above in connection with the cooling of left end panel 5. The final flow channel within left end panel 4 is indicated generally in FIG. 9 by reference numeral 50. Channel 50 is connected to a passage 51, which communicates with exit port 14, as illustrated in FIG. 11.

Figure 6:
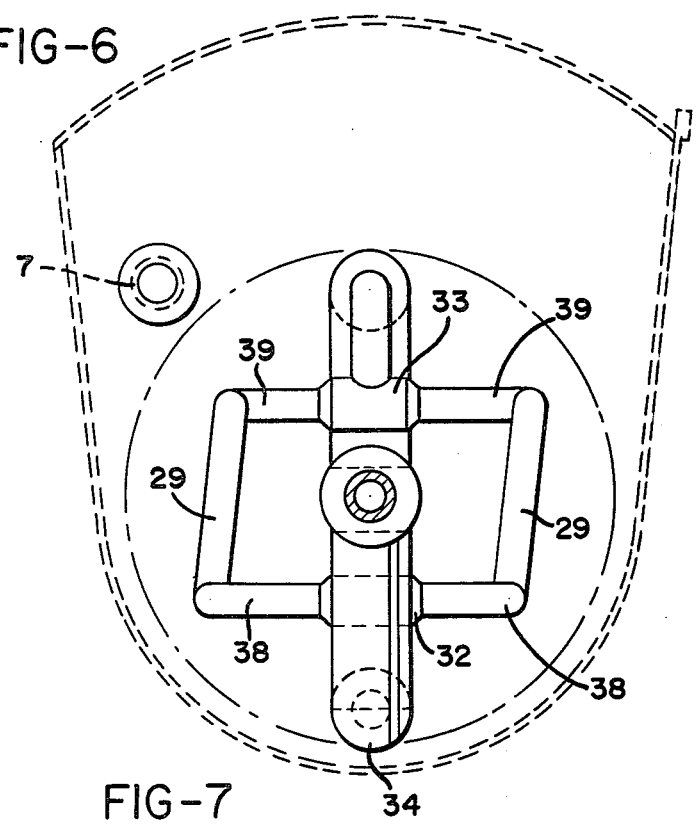
FIG. 6 is a side elevation view of an agitator assembly.
Figure 7:
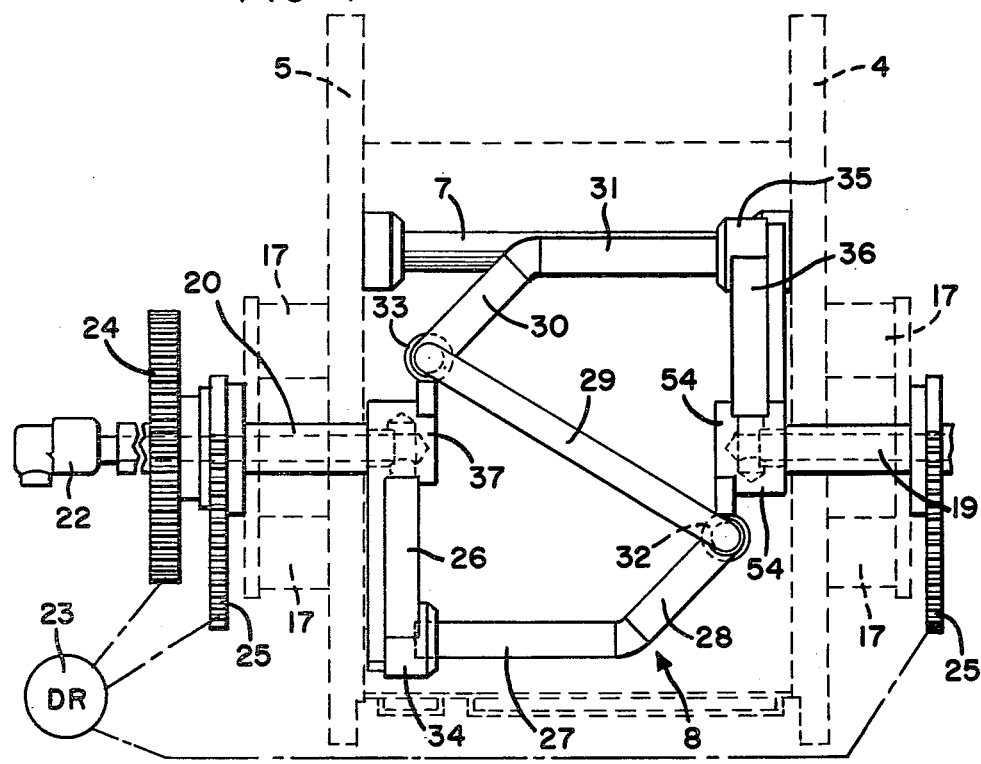
FIG. 7 is a front elevation view of an agitator assembly.
Figure 8:
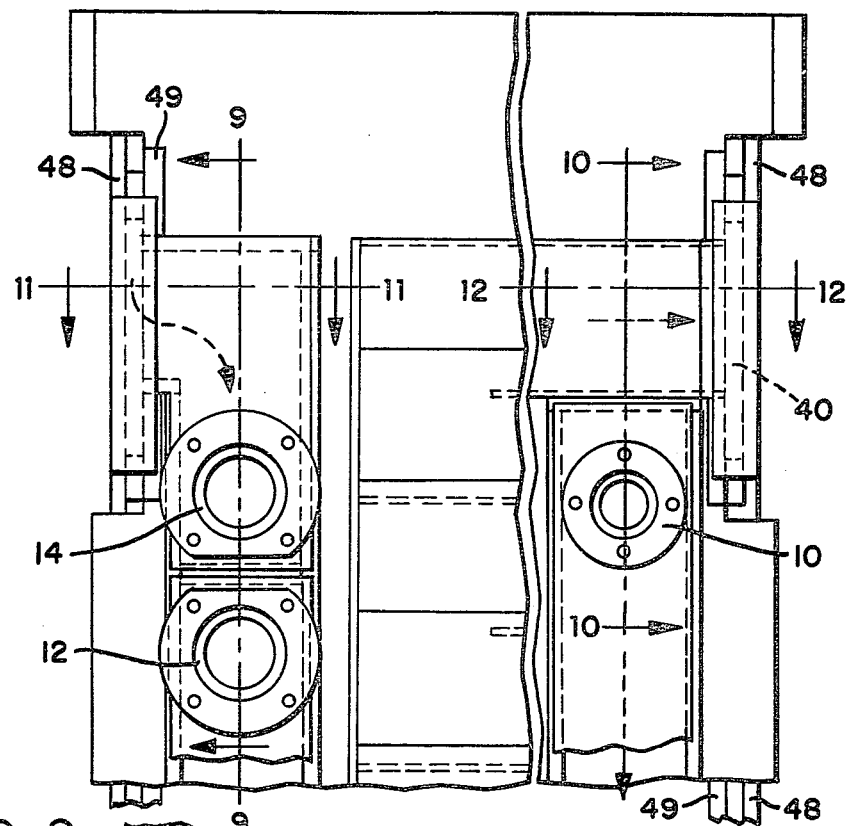
FIG. 8 is an enlarged view of a portion of FIG. 2.

The general arrangement for the preferred agitator is illustrated in FIGS. 6 and 7. Agitator 8 is supported by a pair of hollow shafts 19 and 20, each of which is driven by a drive gear 24 (only one such drive gear being illustrated.) The drive gears are connected for driving by a drive means 23. Drive means 23 also drive a pair of sector gears 25, which are secured to both support plates 18, 18 for rotation of mixing bowl 2. Mixing bowl 2 is normally positioned with the open side upward during loading and mixing. For unloading, drive means 23 engage sector gears 25, 25 to swing mixing bowl 2 downwardly into a position somewhat as illustrated in FIG. 1. Drive means 23 may comprise 2 separate drive motors or a single drive motor with a clutch arrangement.

Shaft members 20 and 19 are connected respectively to rotary seals 22 and 21 (See FIG. 13) for receipt and discharge of a cooling fluid. The cooling fluid flows from shaft 20 through a hub member 37 and thence into a hollow spoke 26. It then flows through a hub 34, a hollow tube 27, and another tube 28 into a tee connector 32. Tee connector 32 supplies a flow of cooling fluid into a pair of hollow arms 38, 38. The cooling fluid then flows through another pair of hollow arms 29, 29 into hollow arms 39, 39. Fluid flow within arms 39, 39 joins at a tee connector 33 and flows into hollow tubes 30 and 31. Hollow tube 31 is connected to a hub 35, which in turn is connected to a hollow spoke 36. Hollow spoke 36 carries cooling fluid through a hub member 54 and into hollow shaft 19 for return to the cooling fluid supply system.

Figure 13:
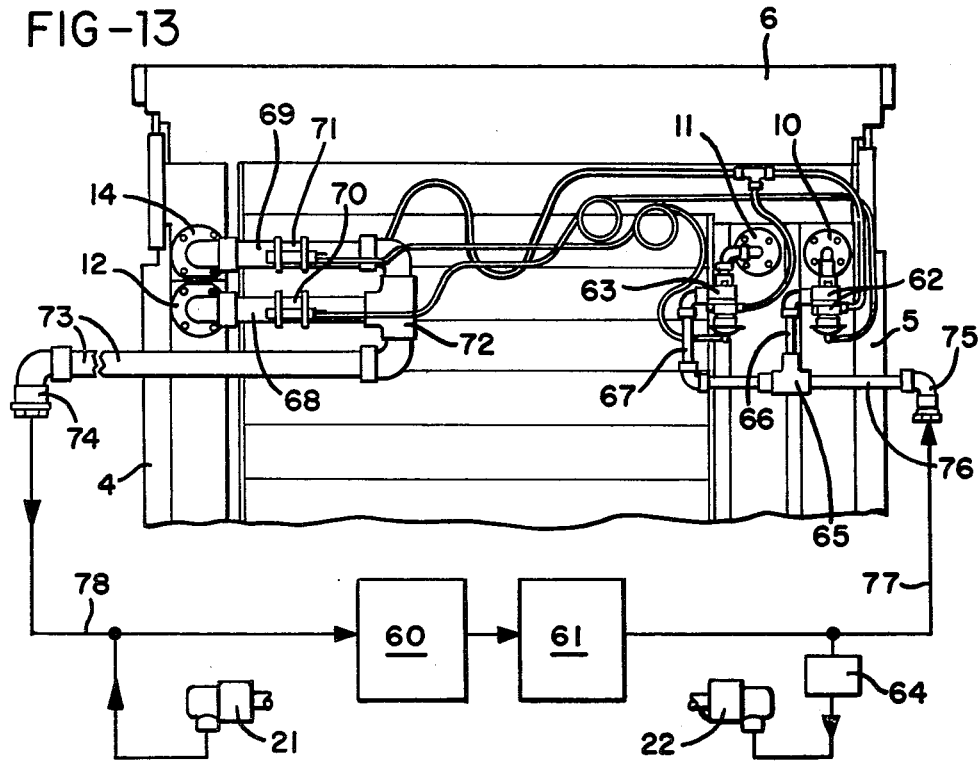
FIG. 13 is a schematic illustration of a cooling system for a dough mixer.

The cooling fluid supply system is illustrated generally in FIG. 13. The system includes a compressor 60, a heat exchanger 61, and expansion valves 62 through 64. Expansion valve 64 receives liquid coolant, such as freon 12 or freon 22 from heat exchanger 61 and provides coolant in gaseous form to rotary seal 22. Compressor 60, heat exchanger 61, and expansion valve 64 may be mounted at any convenient location within cabinet 3. Expansion valve 64 provides coolant for agitator 8, and agitator 8 discharges the coolant fluid into rotary seal 21 for return to compressor 60. Heat exchanger 61 is connected via a flexible line 77 to bowl inlet fitting 75. Inlet fitting 75 is connected via inlet pipe 76, tee connection 65 and pipes 66 and 67 to expansion valves 62 and 63. Expansion valve 62 services the cooling path for the lower and front portions of sheet panel 6. Thus the exit from expansion valve 62 is connected to inlet port 10. Expansion valve 63 is connected to inlet port 11 for cooling the rear portion of sheet panel 6, left end panel 5, breaker tube 7, and right end panel 4.

The cooling system also includes a pair of temperature sensors 70 and 71, which are sensitive to the temperatures of the different bowl regions and which are connected for controlling expansion valves 62 and 63 respectively. Temperature sensor 71 is mounted on exit pipe 69 for sensing the temperature of coolant fluid leaving mixing bowl 2 via outlet port 15. Temperature sensor 70 is mounted on exit pipe 68 for sensing the temperature of coolant fluid leaving mixing bowl 2 via outlet port 12. Exit pipes 68 and 69 are connected to a tee fitting 72 which delivers used cooling fluid to exit pipe 73 and exit fitting 74. Exit fitting 74 is connected via a flexible line 78 to compressor 60.

Figure 14:
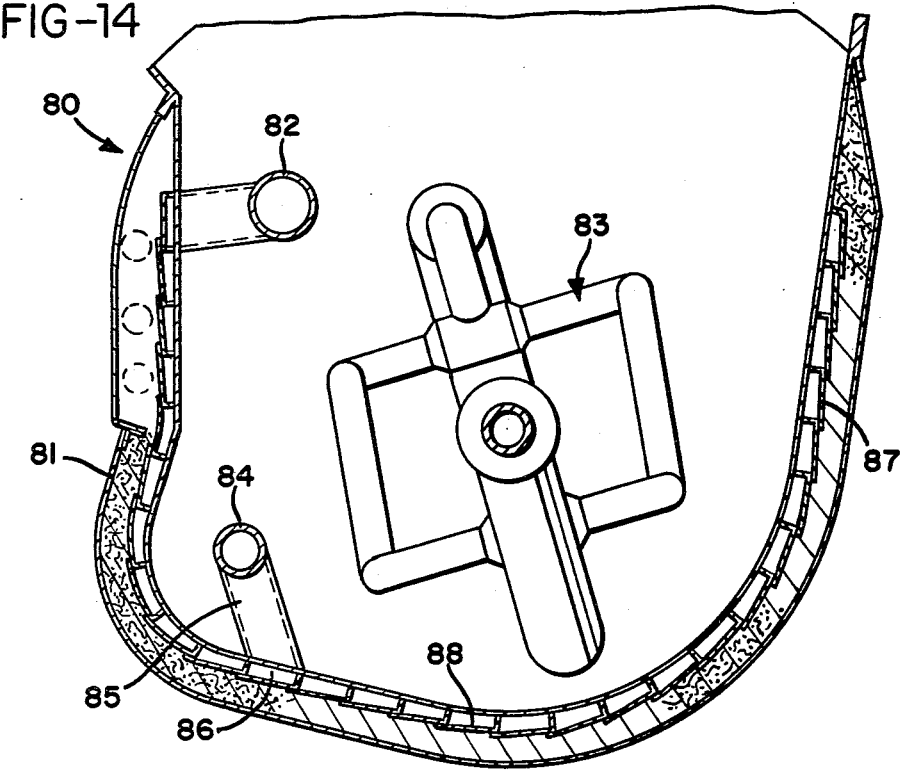
FIG. 14 is a cross sectional drawing of a mixing bowl according to an alternative embodiment of the invention.

An alternative embodiment of the invention may comprise a mixing bowl 80, as generally shown in cross section in FIG. 14. Mixing bowl 80 comprises a sheet panel 81, a pair of end panels (not illustrated), a hollow breaker tube 82, and a hollow agitator 83, all constructed generally in a similar manner as their counter parts in mixing bowl 2 as described above. Mixing bowl 80 also comprises a hollow dough retarding tube 84. Dough retarding tube 84 is functionally similarly to breaker tube 82 and is cooled by a circulating cooling fluid. Thus dough retarding tube 84 is connected via a channel 85 to a passage 86 within sheet panel 81. Cooling fluid for passage 86 enters sheet panel 81 via an inlet port corresponding to inlet port 10 and sequentially cools front portion 87 and lower portion 88 respectively of sheet panel 81, before entry into dough retarding tube 84 and exit from the bowl through an exit port corresponding to exit port 12 of the first described embodiment. Agitator 83 has its own supply of cooling fluid and breaker tube 82 is cooled in series with the two end panels and the rear portion of sheet panel 81.

While the forms of apparatus herein described constitute preferred embodiments of the invention, it is to be understood that the invention is not limited to this precise form of apparatus, and that changes may be made therein without departing from the scope of the invention.

What is claimed is:

1. In a dough mixer comprising a tilting open top bowl, an agitator mounted within said bowl and means for providing a supply of cooling fluid to said bowl; said bowl comprising a sheet panel curved about an axis lying within said bowl, a pair of end panels joined to said sheet panel for closing out the ends of said bowl, and means within said sheet panel defining a series of side-by-side flow channels which extend between said end panels and which are interconnected at alternate ends for creation of a generally serpentine flow path for said cooling fluid; the improvement wherein a hollow breaker tube extends between said end panels and wherein said channel defining means define a plurality of segregated serpentine flow paths, each having inlet and outlet ports connected for separately circulating said cooling fluid and cooperatively cooling substantially the entire interior surface of said sheet panel; the interior of said breaker tube being connected in series with one of said serpentine flow paths so that said cooling fluid circulates therethrough and cools said breaker tube.

2. Apparatus according to claim 1 wherein the front and rear portions of said sheet panel are cooled by coolant flowing in different ones of said serpentine path.

3. Apparatus according to claim 1 wherein said channel defining means define a first serpentine flow path for cooling the lower and front portions of said sheet panel and a second serpentine flow path for cooling the rear portion of said sheet panel.

4. Apparatus according to claim 1 wherein said dough mixer comprises means defining fluid flow channels within said end panels, means for circulating said cooling fluid through said flow channels, and means connecting said flow channels in series with said serpentine flow paths.

5. Apparatus according to claim 1 wherein said agitator comprises a hollow tubular structure extending back and forth between said end panels, a pair of hollow support shafts supporting the ends of said agitator and communicating with the interior thereof, and a pair of rotary seals connecting the interiors of said support shafts to a supply of cooling fluid.

6. Apparatus according to claim 1 wherein said cooling fluid in supplied to said bowl in liquid form and wherein said mixer comprises a plurality of expansion valves mounted on said bowl for converting said liquid to a gas prior to entry into said serpentine paths.

7. Apparatus according to claim 6 wherein said mixer comprises temperature sensing means mounted on said bowl and connected for controlling the operation of said expansion valves.

8. A refrigerated dough mixer comprising an open top bowl including a curved sheet panel and a pair of parallel end panels disposed at opposite ends of said sheet panel, means for providing a supply of cooling fluid to said bowl, an agitator extending between said end panels and journaled for rotation within said bowl, a hollow breaker tube extending between said end panels, a hollow dough retarding tube extending between said end panels, means within said sheet panel defining a series of side-by-side flow channels which extend between said end panels and which are interconnected for circulating said cooling fluid and cooperatively cooling substantially the entire interior surface of said sheet panel, means defining fluid flow channels within said end panels for circulating said cooling fluid and cooperatively cooling substantially the entire interior surface of said end panels, means causing said cooling fluid to be circulated through said breaker tube and said dough retarding tube, temperature sensing means for sensing the temperature within said bowl, and control means responsive to said temperature sensing means for controlling the flow of said cooling fluid.

9. Apparatus according to claim 8 wherein said control means comprises expansion valve means for converting said cooling fluid from a liquid to a gas at a controlled rate.

10. Apparatus according to claim 9 wherein said side-by-side flow channels are interconnected at alternate ends to define a plurality of segregated serpentine flow paths, one which is connected in series with the interior of said breaker tube and with the channels within at least one of said end panels.

11. Apparatus according to claim 10 wherein said agitator comprises a hollow tubular structure and wherein said mixer comprises rotary seal means for circulating said cooling fluid through said agitator.

12. Apparatus according to any of claims 9 through 11 wherein said expansion valve means are mounted on said bowl.

* * * * *